June 8, 1943.     C. R. JOHNSON ET AL     2,321,298
AMMUNITION MANUFACTURE
Filed Jan. 30, 1942
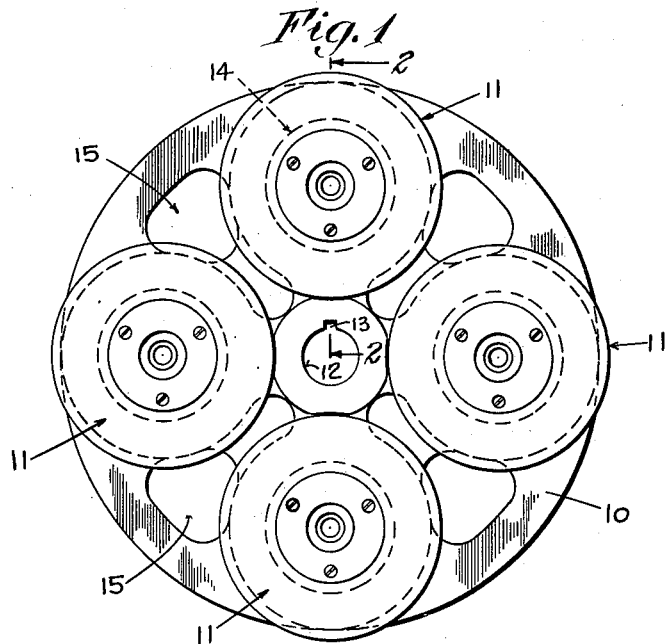
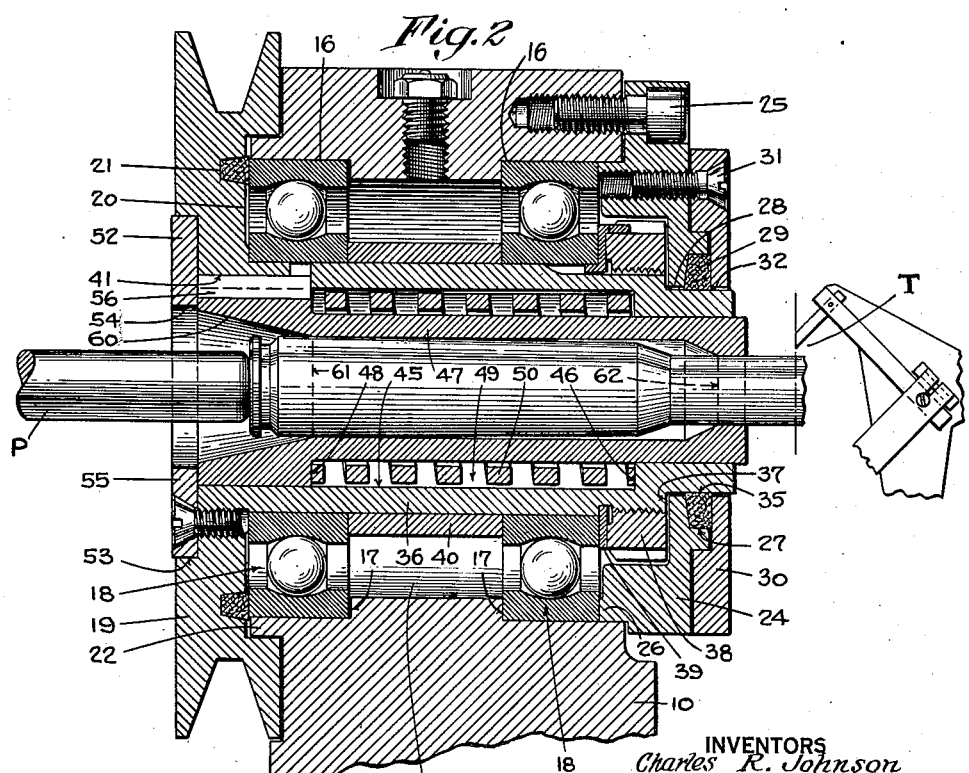
INVENTORS
Charles R. Johnson
William P. G. Hall
BY
Harold L. Gammons
AGENT Patented June 8, 1943

2,321,298

UNITED STATES PATENT OFFICE 2,321,298

AMMUNITION MANUFACTURE

Charles R. Johnson, Glen Mills, and William P. G. Hall, Berwyn, Pa., assignors to Remington Arms Company, Inc., a corporation of Delaware Application January 30, 1942, Serial No. 428,822

18 Claims. (Cl. 164—36)

The present invention relates in general to trimming machines, and more particularly to a machine for automatically trimming articles to a predetermined length.

The machine hereinafter described illustrates the application of the invention to the process of trimming the mouth portion of a cartridge case so as to form a case of predetermined overall length, but it will be understood that this is by way of example only and that the invention may have other applications within the scope of the appended claims.

In the production of cartridge cases it is of primary importance that the overall length of each case be maintained substantially uniform; otherwise the finished cartridges will vary in length and hence be unfit for use in firearms and especially in automatic or semi-automatic guns. As is well understood, the allowable tolerances in the length of the cartridges used in automatic loading and ejecting mechanisms are relatively small and hence cartridges which vary only slightly in length are quite likely to jam the mechanism or render the operation of the gun hazardous.

Although machines prior to applicants' invention have been built for trimming articles to predetermined length, these machines are not constructed to satisfactorily cope with the problem presented in trimming cartridge cases.

The case of a rifle cartridge of medium or high power is substantially a non-uniformly tapered cylindrical shell having a relatively large transverse base dimension and a relatively small transverse mouth dimension.

It is desirable, therefore, in order to satisfactorily hold the case in engagement with trimming means, to use a solid chuck—that is to say a one-piece sleeve-like element provided with a bore having substantially the same longitudinal taper and transverse dimensions as a cartridge case. However, it was found that when using a solid chuck the permissible variations in outside diameter of the cartridge cases permitted some cases to be fed further into the chuck than others, as a consequnce of which the cases of minimum outside diameter were trimmed shorter than cases of maximum outside diameter.

The present invention offers the solution of this problem in disclosing means for supporting a solid chuck so that all articles fed into the chuck and held thereby in trimming position may be automatically trimmed to substantially the same predetermined length irrespective of permissible variations in the transverse dimensions of the article.

It is therefore an object of this invention to provide a machine for trimming articles of varying transverse dimensions uniformly to a predetermined length. A further object is to provide mechanism which supports an article in operative relation with a trimming tool in accordance with the transverse dimension of the article so that the article is trimmed off to a predetermined length. A still further object is to feed cup-shaped articles to a solid chuck which is adapted to rotatably support the article in engagement with a trimming tool and which is movable with respect to the trimming tool in a direction transverse to the cutting plane thereof so as to compensate for variations in the effective diameter of each respective work piece in the chuck, and thereby automatically locate the article opposite the tool in a position such that the article will be trimmed to a predetermined length.

Other objects, features and advantages of the invention will be more fully described in the specification below.

In the drawing:

Fig. 1 is a front elevation of the carrier showing four equally spaced work holding devices mounted therein.

Fig. 2 is an elevation on line 2—2 of Fig. 1 showing one work-holding device in section and schematic illustrations of work feeding and trimming elements.

Referring to Fig. 1, 10 is a carrier for supporting the work holding devices 11 hereinafter described. The carrier is shown as comprising a disk-like structure having a drilled hole 12 axially thereof for mounting the carrier on a suitable drive shaft (not shown). A suitable key way 13 is provided in the drilled hole 12 for a key by which the carrier may be secured to rotate with the the drive shaft. In its present embodiment the carrier is constructed and arranged to be intermittently rotated by suitable indexing means connected to the drive shaft so as to successively carry each work holding device 11 opposite suitable work feeding and trimming means. The work holding devices 11, four of which are shown, are mounted in holes 14 equally spaced around the perimeter of the carrier. Although four holding devices are specified, it will be understood that more or fewer holding devices may be mounted in the carrier and that the carrier may have other modified and equivalent forms within the scope of the invention. The triangular shaped cut-outs 15 between each pair of work holding devices are intended to lighten the carrier so as to provide a more mobile structure.

Referring to Fig. 2, the work feeding means P and work trimming means T are indicated schematically to show merely the operative relation of each to the carrier and to each other. The feeding means may be a pusher rod P suitably supported in axial alignment with the axis of a work holding device, when one of such devices has been indexed to work trimming position, and adapted to be reciprocated by suitable mechanism (not shown) from its normal position to its operative position. As hereinafter used, the term "normal position" shall be understood to designate the position from which a device is moved to perform its function. In accordance with the present invention, the pusher rod P is moved forwardly from its normal position a predetermined distance with respect to the carrier 10, as a consequence of which articles advanced by the pusher are similarly located with respect to the carrier.

The trimming means T is also illustrative only of a suitable cutter for trimming the articles held in the work holding devices, and in the present embodiment is arranged to operate on the articles to be trimmed at a fixed and predetermined distance from the carrier 10.

It will be understood that no claims are made herein in the construction and operation of the feeding means or trimming means per se, details of which may be shown and described in the prior art, as, for example, the patent to McCreary, No. 1,967,153, July 17, 1934, or the copending application of Reynolds, S. N. 396,406, filed June 3, 1941.

Each work holding device 11 is constructed and arranged to support a solid chuck in the carrier in axial alignment with the work feeding means P and trimming tool T.

Referring to Fig. 2, both rims of the drilled hole 14 of the carrier are countersunk as at 16—16 to provide annular seats 17—17 for a pair of single row ball bearing races 18—18. The ball bearing race 18 in the countersink 16 adjacent the feeding means P is retained in the carrier by the inner face of a pulley 19 which is rotated by a suitable belt drive not shown. To this end the rear face of the pulley is provided with an annular groove 21 having a felt packing ring which presses against the outer bearing race so as to hold the ring on its seat 17, the thickness of the felt being such that no excessive end pressure shall be created to preload the bearing race.

The rim of the countersink 16 has a flange 22 projecting outwardly from the face of the carrier which constitutes an annular guide for the pulley 19, the rear face portion 20 of which is recessed to fit over the annular guide 22, thereby centering the pulley concentrically with respect to the drilled hole 14.

The bearing race, at the opposite end of the hole 14, is held on its seat 17 in the countersink 16 by a discoidal bearing plate 24 bolted as at 25 to the carrier and provided with a drilled hole 28 and an inwardly projecting annular flange 26, the latter being in contact with the outer race of the ball bearing. The outer face of the bearing plate is countersunk as at 27 adjacent the edge of the drilled hole 28 for seating a felt packing ring 29 which is held on its seat by a cover plate 30 fastened over the outer face of the bearing plate by suitable screws 31. The cover plate 30 has an axially drilled hole 32 substantially equal in diameter to the diameter of the hole 28 of the bearing plate. When the bearing plate 24, felt ring 29 and cover plate 30 are assembled as shown, the respective holes 28 and 32 are in axial alignment and form a laminated bearing surface for supporting the reduced end portion 35 of a hollow spindle 36 rotatably mounted in the ball bearings 18—18.

A shoulder 37 is formed on the end of the hollow spindle 36 by reducing the outside diameter thereof as at 35, and abuts the inner face of the bearing plate 24 so as to prevent longitudinal displacement of the spindle relative to the carrier and the laminated bearing. However, sufficient tolerance is left between the shoulder 37 and bearing plate 24 to permit slight longitudinal displacement of the spindle by a lock nut 38 which is adapted to take up any looseness of the spindle due to wear.

The lock nut 38 is threaded on the end of the hollow spindle 36 adjacent the reduced portion 35 and is of suitable dimensions such that it may be assembled within the annular space defined by the bearing plate 24, the flange portion 26 thereof and the roller bearing 18. A convenient metal lock ring 39 is keyed to the spindle 36 between the outer face of the inner race of the roller bearing and the adjacent face of the lock nut 38 to lock the lock nut to the spindle.

A collar 40 is freely mounted on the hollow spindle 36 between the two roller bearings 18—18 for retaining the inner races of the ball bearings in proper spaced-apart relation.

As shown, the pulley 19 is formed integrally with the left end (Fig. 2) of the hollow spindle 36, the spindle comprising in effect a tubular axle rotated in the roller bearings 18—18 by the pulley 19. It will be understood, however, that other suitable means of fastening the pulley to the spindle may be used. A longitudinally extending keyway 41 is milled or otherwise formed in the inner wall of the hub portion of the hollow spindle to seat a key or spline for a purpose hereinafter described.

The inside diameter of the hollow spindle is reduced adjacent the shoulder portion 37 thereof so as to form in effect a countersink 45 which extends for a major portion of the length of the hollow sleeve and which has a seat or shoulder 46.

47 is a solid sleeve-like chuck supported at its opposite ends in the hollow spindle 36 for holding the cartridge cases. The outside diameter of the chuck for the major portion of its length is substantially equal to the inside diameter of the spindle at its reduced section, while the remaining portion of the chuck is formed with a shoulder 48 of substantially the diameter of the countersink 45. The chuck is thus supported concentrically within the hollow spindle at substantially its opposite ends only the shoulder portion 48 of the chuck and the shoulder portion 46 of the hollow spindle co-acting with adjacent sleeve portions of the spindle and chuck respectively to define an annular chamber or pocket 49.

50 is a substantially cylindrical coil spring enclosed within the longitudinally extending pocket 49 between the spindle and chuck, the opposite ends of the spring abutting the shoulder 48 and seat 46 of the chuck and spindle respectively. Since the hollow spindle 36 is substantially immovable longitudinally in the carrier, the spring tends to move the chuck to the left (Fig. 2) with respect to the spindle. To prevent the displacement of the chuck in this direction, a retaining plate 52 is secured by screws in a suitable countersink 53 in the outer face of the pulley 19, the plate having a hole 54 drilled in the center thereof of slightly less diameter than the diameter of the countersink 45 so as to form an annular lip 55 abutting the end of the chuck. It will be clear that the chuck is thus held in its normal position against the lip 55 by the spring 50 but may be moved longitudinally to the right with respect to the spindle against the restraining force of the spring 50.

In order that the chuck 47 may move longitudinally in the spindle 36 and simultaneously be rotated thereby, a suitable key way is cut in the shoulder of the chuck opposite the key way 41 of the spindle and a spline 56 is seated in the key ways to lock the chuck and spindle against relative angular displacement. It will be observed that the retaining plate 52 covers the end of the key so as to secure it in effective position.

The bore of the chuck 47 varies throughout the length of the chuck. At the end adjacent the feeding means the bore is relatively large but tapers steeply as shown at 60 to a diameter at 61 which is substantially equal to the minimum allowable diameter of a cartridge case at its base portion. From the section 61 the bore is formed substantially cylindrical or with an extremely flat taper for a major portion of the length of the chuck, and at its extreme right end the bore is tapered sharply to a section 62 which has substantially the minimum diameter allowed for the mouth portion of a cartridge case. Inasmuch as the walls of a cartridge case are tapered slightly more than the flat taper specified for the bore of the chuck, it will be evident that a cartridge case having minimum transverse measurements will be gripped by the chuck at substantially two sections only, namely, at its base portion and at its mouth. This method of support is provided so as to insure concentric allocation of the case with respect to the chuck.

In operation the carrier 10 is indexed to rotate a work holding device 11 into axial alignment with the work feeding means P and the trimming tool T. The feeding means then moves to within a predetermined distance of the carrier, thereby advancing a cartridge case into the rotating chuck 47 of the work holding device, whereupon the chuck grips the case and holds it in position to be trimmed by the trimming tool T. The latter, as mentioned above, is operable at a predetermined distance with respect to the carrier, and hence it will be clear that the distance between the end of the pusher P when in its foremost position and the cutter T is predetermined or constant, and that cases which are supported in the work holding device between the pusher and the cutter must be trimmed uniformly to the same predetermined overall length.

Cases of minimum transverse dimension are readily advanced by the pusher P into engagement with the gripping surfaces of the solid chuck and into proper trimming relation with respect to the trimming tool. Since the bore of the solid chuck is sized for cartridges having minimum transverse dimensions, there will be no excessive longitudinal force exerted by the pusher tending to move the chuck with respect to the spindle, and consequently the chuck remains in substantially its normal retracted position.

However, when cases of standard and maximum transverse dimensions are fed into the chuck the force exerted by the pusher in arriving at its predetermined foremost position with respect to the carrier tends to move the chuck longitudinally with respect to the spindle. Since the chuck is free to move in this direction it moves against the restraining force of the coil spring 50 until the pusher has positioned the mouth of the cartridge in proper relation with respect to the trimming tool. After the mouth of the case has been trimmed to the proper length the pusher retreats and the chuck 47 is returned to its normal position by the force of the compressed spring.

It will be evident that cartridge cases of standard transverse dimensions tend to move further into the chuck than cases having maximum transverse dimensions. Consequently in the former instance only a relatively short movement of the chuck is necessary to properly locate the case with respect to the tool T, whereas for cartridges having maximum transverse dimensions a relatively large displacement of the chuck is necessary. In short, the displacement of the chuck in the spindle in the direction of the longitudinal dimensions of the cases is, in its broad aspects, substantially proportional to the transverse dimensions of the case in the chuck.

Although the above description relates to the particular machine shown and described, it will be understood that other variations and modifications may be made within the scope of the appended claims.

What is claimed is:

1. A device for trimming work pieces to a predetermined dimension, comprising a carrier, work inserting means movable to a predetermined position with respect to said carrier, work trimming means operable in a predetermined position with respect to said carrier, and work holding means mounted in said carrier for longitudinal movement.

2. A device for trimming work pieces to a predetermined dimension, comprising a carrier, work inserting means movable to a predetermined position with respect to said carrier, work trimming means operable in a predetermined position with respect to said carrier, and work holding means mounted in said carrier for movement in the direction of said dimension.

3. A device for trimming work pieces to a predetermined dimension, comprising a carrier, work inserting means movable to a predetermined position with respect to said carrier, work trimming means operable in a predetermined position with respect to said carrier, and work holding means mounted in said carrier for movement in the direction of the trimmed dimension, which movement is proportionate to variations in a dimension transverse thereto.

4. A device for trimming work pieces to a predetermined dimension comprising a carrier, work inserting means movable to a predetermined position with respect to said carrier, work trimming means operable in a predetermined position with respect to said carrier, and work holding means mounted in said carrier and displaceable therein by a work piece while holding said work piece in operative relation to said trimming means.

5. In a device for trimming work pieces to a predetermined length, a carrier; work inserting means movable to a predetermined position with respect to said carrier, work trimming means operable in a predetermined position with respect to said carrier; work holding means in said carrier comprising a solid chuck mounted for displacement in the direction of the length of the work piece to be trimmed; and resilient means tending to move said chuck toward said work inserting means.

6. In a device for trimming work pieces to a predetermined length, a carrier; work inserting means movable to a predetermined position with respect to said carrier; work trimming means operable in a predetermined position with respect to said carrier; and work holding means comprising a solid chuck adapted for displacement in the direction of the length of the piece to be trimmed while holding said piece in operative relation to said trimming means.

7. In a device for trimming work pieces to a predetermined length, a carrier; work inserting means movable to a predetermined position with respect to said carrier; work trimming means operable in a predetermined position with respect to said carrier; work holding means comprising a solid chuck adapted for displacement in the direction of the length of the piece to be trimmed while holding said piece in operative relation to said trimming means; and resilient means biasing said chuck to a normal position.

8. In a device for trimming work pieces to a predetermined length, a carrier; work inserting means movable to a predetermined position with respect to said carrier; work trimming means operable in a predetermined position with respect to said carrier; and work holding means in said carrier comprising a housing, a hollow chuck spindle in said housing, means for rotating said chuck spindle, a one-piece chuck mounted for displacement with respect to said chuck spindle in the direction of the length of the work piece to be trimmed, and a spring tending to move the chuck toward said work inserting means.

9. In a device for trimming work pieces to a predetermined length, a carrier; work inserting means movable to a predetermined position with respect to said carrier; work trimming means operable in a predetermined position with respect to said carrier; and work holding means comprising a housing in said carrier, a hollow spindle rotatably supported in said housing, means for rotating said spindle, a hollow one-piece chuck mounted within said spindle and means for connecting the chuck to the spindle so that the chuck is rotated by said spindle, said means permitting displacement of the chuck in the spindle in the direction of the length of the piece to be trimmed while holding said piece in operative relation to said trimming means.

10. In a device for trimming work pieces to a predetermined length, a carrier; work inserting means movable to a predetermined position with respect to said carrier; work trimming means operable in a predetermined position with respect to said carrier; and work holding means comprising a housing in said carrier, a hollow spindle in said housing having a countersunk portion, means for rotating said spindle in said housing, a one-piece chuck having a shoulder cooperating with the countersunk portion of said spindle to define a pocket circumscribing said chuck, said chuck being splined to said rotatable spindle for displacement in the direction of the length of the piece to be trimmed while holding said piece in operative relation to said trimming means, and a coil spring carried in said pocket biasing said chuck to a normal position.

11. In a device for trimming drawn metallic cases to a predetermined length, a carrier; case inserting means movable to a predetermined position with respect to said carrier; case trimming means operable in a predetermined position with respect to said carrier; and chuck mechanism for holding said cases comprising a housing secured in said carrier, a hollow spindle rotatably mounted in said housing, a pulley secured to one end of said spindle for rotating said spindle in said housing, said spindle being countersunk axially for a major portion of its length, a solid chuck longitudinally displaceable within said spindle having a shoulder portion at one end cooperating with the countersunk portion of said spindle to form a longitudinal pocket circumscribing said chuck, a coil spring in said pocket, one end of said spring abutting the shoulder portion of said chuck, the opposite end of said spring abutting the seat of said countersink whereby said chuck is restrained against longitudinal displacement with respect to said spindle while holding a case in engagement with said trimming means, said chuck having a bore of varying diameter so as to grip said case at substantially its opposite ends only.

12. In a machine for trimming work pieces to a predetermined length comprising, in combination, a carrier; means for feeding work pieces to a predetermined position with respect to said carrier; work trimming means operable in a predetermined position with respect to said carrier; and work holding means supported in said carrier and movable longitudinally with respect to said carrier, which movement is proportionate to a transverse dimension of a work piece in said holding means.

13. In a machine for trimming work pieces to a predetermined length comprising, in combination, a carrier; a chuck mechanism in said carrier, said chuck mechanism comprising a housing, a hollow spindle rotatably mounted within said housing, means for rotating said spindle, and a hollow one-piece chuck mounted within said spindle and splined thereto so as to be rotated by said spindle; a work piece trimming tool operable in a predetermined position to one side of said carrier; means adjacent the opposite side of said carrier and in axial alignment with said chuck for feeding work pieces to be trimmed to said chuck in a predetermined position relative to said carrier; and resilient means between said one-piece chuck and said chuck spindle permitting longitudinal displacement of said chuck relative to said carrier, which displacement is proportional to the effective diameter of a work piece in said chuck.

14. In a machine for trimming cartridge cases to a predetermined length, the combination of a carrier; a pulley; a sleeve associated with said pulley; means for rotatably supporting said pulley and sleeve in said carrier; a solid chuck within said sleeve having an internal taper; and a spring interposed between said sleeve and said solid chuck normally restraining the chuck against longitudinal displacement relative to said carrier.

15. A chuck mechanism for holding articles to be trimmed to a predetermined length comprising a housing; a hollow spindle rotatable in said housing; means for rotating said spindle; a hollow chuck within said spindle and rotated thereby; and resilient means for permitting longitudinal movement of said chuck in said spindle.

16. A chuck mechanism for holding articles to be trimmed to a predetermined length, comprising a housing; a hollow spindle rotatable in said housing; means for rotating said spindle; a solid sleeve-like chuck within said spindle and rotated thereby, said sleeve-like chuck having a longitudinally tapering bore adapted to grip the articles; and resilient means between said spindle and said sleeve-like chuck for permitting longitudinal movement of said sleeve-like chuck axially of said rotating spindle.

17. A chuck mechanism for holding drawn metallic cases to be trimmed to a predetermined length, comprising a housing; a hollow spindle in said housing having a countersunk portion; means for rotating said spindle; a solid chuck having a shoulder cooperating with the countersunk portion of said spindle to define a pocket circumscribing the chuck, said chuck being supported coaxially within said spindle and splined to said spindle to rotate therewith; and a coil spring carried in said pocket to restrain longitudinal movement of said chuck relative to said hollow spindle.

18. A chuck mechanism for holding drawn metallic cases to be trimmed to a predetermined length, comprising a housing; a hollow spindle mounted to rotate in said housing; a pulley secured to one end of said spindle for rotating said spindle in said housing, said spindle being countersunk axially for a major portion of its length; a one-piece sleeve-like chuck having a shoulder portion at one end cooperating with the countersunk portion of said spindle to form a longitudinal pocket circumscribing said chuck; a coil spring in said pocket, one end of said spring abutting the shoulder portion of said chuck, the opposite end of said spring abutting the seat of the countersink whereby said chuck is restrained from longitudinal displacement relative to said hollow spindle, said chuck having a bore of varying diameter adapted to grip a drawn metallic case at substantially its opposite ends only.

CHARLES R. JOHNSON.
WILLIAM P. G. HALL.